United States Patent
Kean

(10) Patent No.: US 9,569,768 B2
(45) Date of Patent: Feb. 14, 2017

(54) SYSTEMS, METHODS AND APPARATUS FOR SELECTING A PAYMENT ACCOUNT FOR A PAYMENT TRANSACTION

(75) Inventor: Brian T. Kean, Missouri Valley, IA (US)

(73) Assignee: First Data Corporation, Greenwood Village, CO (US)

( * ) Notice: Subject to any disclaimer, the term of this patent is extended or adjusted under 35 U.S.C. 154(b) by 1342 days.

(21) Appl. No.: 12/389,863

(22) Filed: Feb. 20, 2009

(65) Prior Publication Data

US 2010/0217674 A1 Aug. 26, 2010

(51) Int. Cl.

| | |
|---|---|
| *G06Q 20/00* | (2012.01) |
| *G06Q 40/00* | (2012.01) |
| *G06Q 20/34* | (2012.01) |
| *G06Q 20/20* | (2012.01) |
| *G06Q 20/40* | (2012.01) |
| *G06Q 30/06* | (2012.01) |
| *G07F 7/10* | (2006.01) |

(52) U.S. Cl.
CPC .......... *G06Q 20/341* (2013.01); *G06Q 20/204* (2013.01); *G06Q 20/3572* (2013.01); *G06Q 20/40* (2013.01); *G06Q 30/06* (2013.01); *G06Q 40/12* (2013.12); *G07F 7/10* (2013.01)

(58) Field of Classification Search
USPC .......................................................... 705/17
See application file for complete search history.

(56) References Cited

U.S. PATENT DOCUMENTS

| | | | | |
|---|---|---|---|---|
| 5,884,271 | A * | 3/1999 | Pitroda .................. | G06Q 20/02 705/2 |
| 6,732,919 | B2 * | 5/2004 | Macklin ............... | G06Q 20/342 235/375 |
| 6,886,741 | B1 * | 5/2005 | Salveson ................ | G06Q 20/02 235/375 |
| 7,757,943 | B2 * | 7/2010 | D'Angelo ............ | G06Q 20/341 235/380 |
| 7,761,353 | B1 * | 7/2010 | Silverman ............ | G06Q 20/102 273/139 |
| 7,784,692 | B1 * | 8/2010 | Arrington, III ...... | G06K 7/0008 235/379 |
| 7,832,646 | B1 * | 11/2010 | Leason ................ | G06Q 20/102 235/492 |
| 7,856,399 | B2 * | 12/2010 | Wilkes .................... | G06Q 20/10 705/39 |
| 7,890,422 | B1 * | 2/2011 | Hirka ..................... | G06Q 20/04 705/39 |
| 7,899,754 | B2 * | 3/2011 | Ripberger ............... | G06F 21/10 705/51 |

(Continued)

*Primary Examiner* — Ashford S Hayles
(74) *Attorney, Agent, or Firm* — Sutherland Asbill & Brennan LLP

(57) ABSTRACT

Systems and methods for selecting a payment account for a payment transaction are provided by certain embodiments of the invention. Data may be collected from a payment device utilized for the transaction, and a plurality of payment accounts may be associated with the payment device. A personal identification number associated with the payment device may be received. At least one of the plurality of payment accounts associated with the payment device may be selected based on a portion of the received personal identification number. The transaction may be facilitated utilizing at least one of the selected payment accounts.

17 Claims, 9 Drawing Sheets

(56) References Cited

U.S. PATENT DOCUMENTS

| | | | | |
|---|---|---|---|---|
| 7,909,243 B2* | 3/2011 | Merkow | G06Q 20/105 | 235/379 |
| 7,996,324 B2* | 8/2011 | Bishop | G06Q 20/00 | 705/64 |
| 8,020,756 B2* | 9/2011 | Brown | G06Q 20/20 | 235/379 |
| 2002/0013904 A1* | 1/2002 | Gardner | G06Q 20/04 | 713/184 |
| 2004/0034594 A1* | 2/2004 | Thomas | G06Q 20/02 | 705/39 |
| 2004/0103096 A1* | 5/2004 | Larsen | G06F 21/6218 | |
| 2004/0117302 A1* | 6/2004 | Weichert | G06Q 20/102 | 705/40 |
| 2004/0155101 A1* | 8/2004 | Royer | G06Q 20/04 | 235/379 |
| 2004/0195315 A1* | 10/2004 | Workens | G06Q 20/10 | 235/380 |
| 2005/0171898 A1* | 8/2005 | Bishop | G06Q 20/00 | 705/39 |
| 2005/0203765 A1* | 9/2005 | Maritzen | G06Q 20/10 | 705/26.1 |
| 2005/0251446 A1* | 11/2005 | Jiang | G06Q 20/06 | 705/14.38 |
| 2005/0256801 A1* | 11/2005 | Bucci | G06Q 20/10 | 705/39 |
| 2006/0085333 A1* | 4/2006 | Wah | G06Q 20/04 | 705/40 |
| 2006/0269061 A1* | 11/2006 | Balasubramanian | C07D 209/88 | 380/247 |
| 2007/0022058 A1* | 1/2007 | Labrou | G06Q 20/32 | 705/67 |
| 2007/0185820 A1* | 8/2007 | Talker | G06Q 20/04 | 705/67 |
| 2007/0228157 A1* | 10/2007 | Eckert | G06Q 20/20 | 235/380 |
| 2008/0046747 A1* | 2/2008 | Brown | G06Q 20/20 | 713/182 |
| 2008/0054065 A1* | 3/2008 | D'Angelo | G06Q 20/341 | 235/380 |
| 2008/0082451 A1* | 4/2008 | Schneider | G06Q 20/12 | 705/64 |
| 2008/0133350 A1* | 6/2008 | White | G06Q 20/06 | 705/14.27 |
| 2008/0164307 A1* | 7/2008 | Silverstein | G07F 17/16 | 235/380 |
| 2008/0201769 A1* | 8/2008 | Finn | G06Q 20/04 | 726/7 |
| 2008/0288396 A1* | 11/2008 | Siggers | G06Q 20/10 | 705/39 |
| 2008/0301041 A1* | 12/2008 | Bruk | G06Q 20/04 | 705/39 |
| 2009/0037275 A1* | 2/2009 | Pollio | G06Q 20/363 | 705/14.26 |
| 2009/0164382 A1* | 6/2009 | Sally | G06Q 20/24 | 705/67 |
| 2009/0171852 A1* | 7/2009 | Taylor | G06Q 20/023 | 705/76 |
| 2009/0192904 A1* | 7/2009 | Patterson | G06Q 20/20 | 705/17 |
| 2009/0228362 A1* | 9/2009 | Lapsley | G01F 19/005 | 705/44 |
| 2009/0292607 A1* | 11/2009 | Eckert | G06Q 20/20 | 705/14.38 |
| 2009/0313131 A1* | 12/2009 | Giordano | G06Q 20/102 | 705/17 |
| 2009/0319638 A1* | 12/2009 | Faith | G06Q 30/06 | 709/219 |
| 2010/0070375 A1* | 3/2010 | Lane | G06F 21/34 | 705/17 |
| 2010/0125495 A1* | 5/2010 | Smith | G06Q 20/3223 | 705/14.23 |
| 2010/0191652 A1* | 7/2010 | Eckert | G06Q 20/204 | 705/67 |
| 2010/0268615 A1* | 10/2010 | Rosenberger | G06Q 20/10 | 705/17 |
| 2010/0306103 A1* | 12/2010 | Hankins | G06Q 20/102 | 705/40 |
| 2011/0000959 A1* | 1/2011 | Randazza | G06Q 20/02 | 235/379 |
| 2011/0010254 A1* | 1/2011 | Chenot | G06Q 20/204 | 705/17 |
| 2011/0078031 A1* | 3/2011 | Mardikar | G06Q 20/20 | 705/17 |
| 2011/0112919 A1* | 5/2011 | Gray | G06Q 20/12 | 705/17 |
| 2012/0209684 A1* | 8/2012 | Postrel | G06Q 20/06 | 705/14.23 |
| 2013/0041814 A1* | 2/2013 | Ankarath | G06Q 40/00 | 705/39 |
| 2013/0124319 A1* | 5/2013 | Hodge | G06Q 20/10 | 705/14.54 |
| 2014/0081855 A1* | 3/2014 | Hankins | G06Q 20/102 | 705/40 |

* cited by examiner

SYSTEMS, METHODS AND APPARATUS FOR SELECTING A PAYMENT ACCOUNT FOR A PAYMENT TRANSACTION

FIELD OF THE INVENTION

Embodiments of the invention relate generally to payment transactions, and more particularly, to systems, methods, and apparatus for selection of a payment account for a payment transaction.

BACKGROUND OF THE INVENTION

A wide variety of cashless transactions are completed utilizing various payment instruments associated with a consumer, such as, credit cards, debit cards, stored value cards, gift cards, etc. Typically, a payment instrument is associated with a single payment account, such as a credit card account or a stored value account. Because each payment instrument is associated with a single payment account, a consumer must often carry multiple payment instruments that the consumer may wish to utilize. The carrying of multiple payment instruments may be inconvenient and cumbersome for the consumer.

Therefore, a need exists in the art for payment instruments that may be associated with multiple payment accounts. There also exists a need in the art for systems, methods, and apparatus for selecting a payment account associated with a payment instrument in order to facilitate a payment transaction.

BRIEF DESCRIPTION OF THE INVENTION

Some or all of the above needs and/or problems may be addressed by certain embodiments of the invention. Embodiments of the invention may include systems and methods for selecting a payment account for a payment transaction. In one embodiment, a method for selecting a payment account to complete a transaction is provided. Data may be collected from a payment device utilized for the transaction, and a plurality of payment accounts may be associated with the payment device. A personal identification number associated with the payment device may be received. At least one of the plurality of payment accounts associated with the payment device may be selected based on a portion of the received personal identification number. The transaction may be facilitated utilizing at least one of the selected payment accounts.

In accordance with another embodiment of the invention, a method for completing a payment transaction may be provided. Account data may be received from a payment device that is associated with a plurality of payment accounts. A portion of a personal identification number received from a customer associated with the payment device may be utilized to select one of the plurality of payment accounts. At least one of the selected payment accounts may be utilized to facilitate the payment transaction.

According to yet another embodiment of the invention, a point of sale terminal for processing a payment transaction may be provided. The point of sale terminal may include at least one reader, at least one input device, and a communications interface. The at least one reader may be operable to obtain account information from a payment instrument associated with a plurality of payment accounts. The at least one input device may be operable to receive a personal identification number associated with the payment instrument, wherein a portion of the personal identification number is utilized to select at least one of the plurality of payment accounts associated with the payment instrument. The communications interface may be operable to communicate at least a portion of the personal identification number and at least a portion of the obtained account information to a payment processor to verify the payment transaction.

Additional systems, methods, apparatus, features, and aspects are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE DRAWINGS

Figure 1:
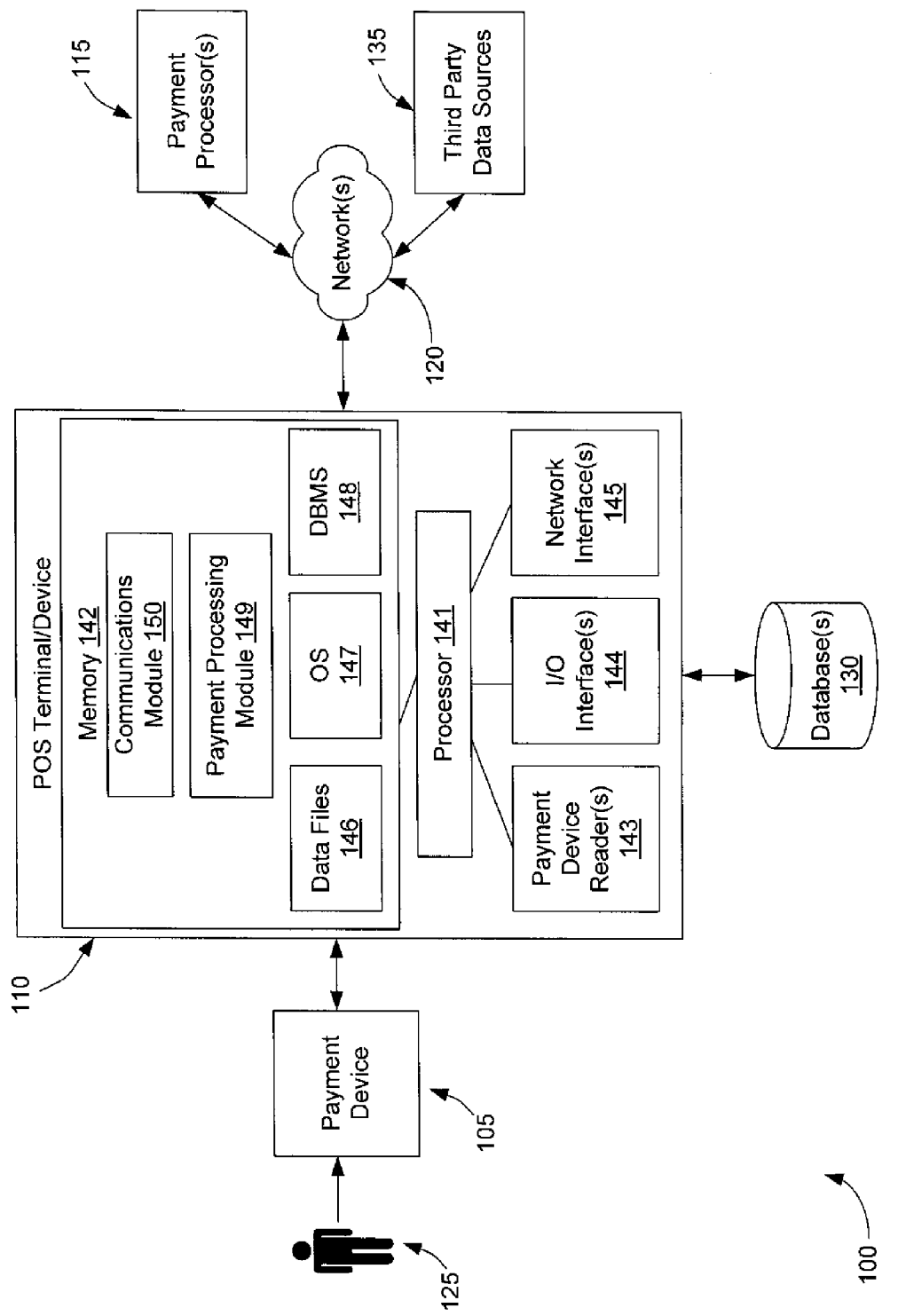

Having thus described the invention in general terms, reference will now be made to the accompanying drawings, which are not necessarily drawn to scale, and wherein:

FIG. 1 is a schematic diagram of one example payment system, according to an illustrative embodiment of the invention.

Figure 2:
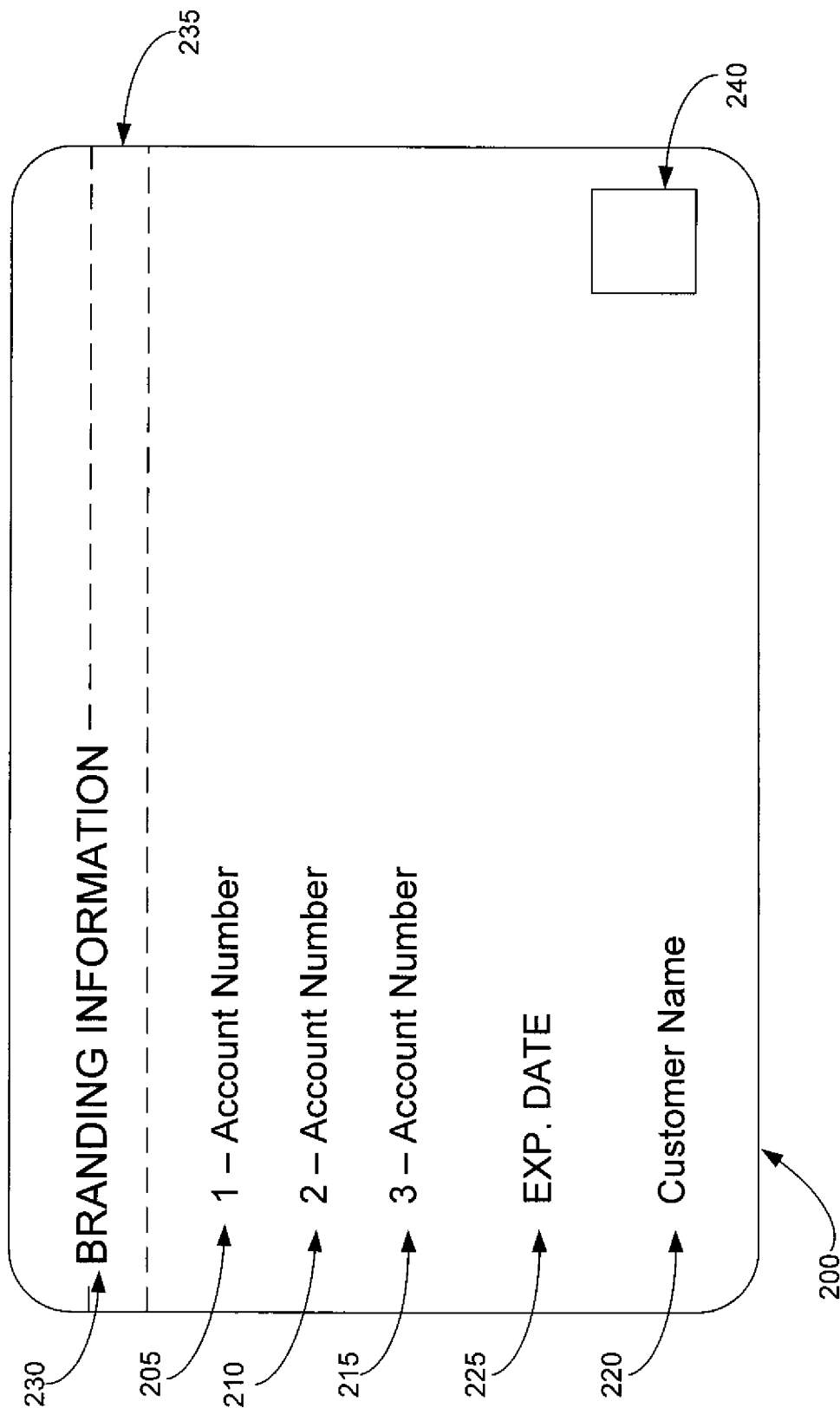

FIG. 2 is a schematic diagram of one example payment instrument that may be utilized in accordance with various embodiments of the invention.

Figure 3:
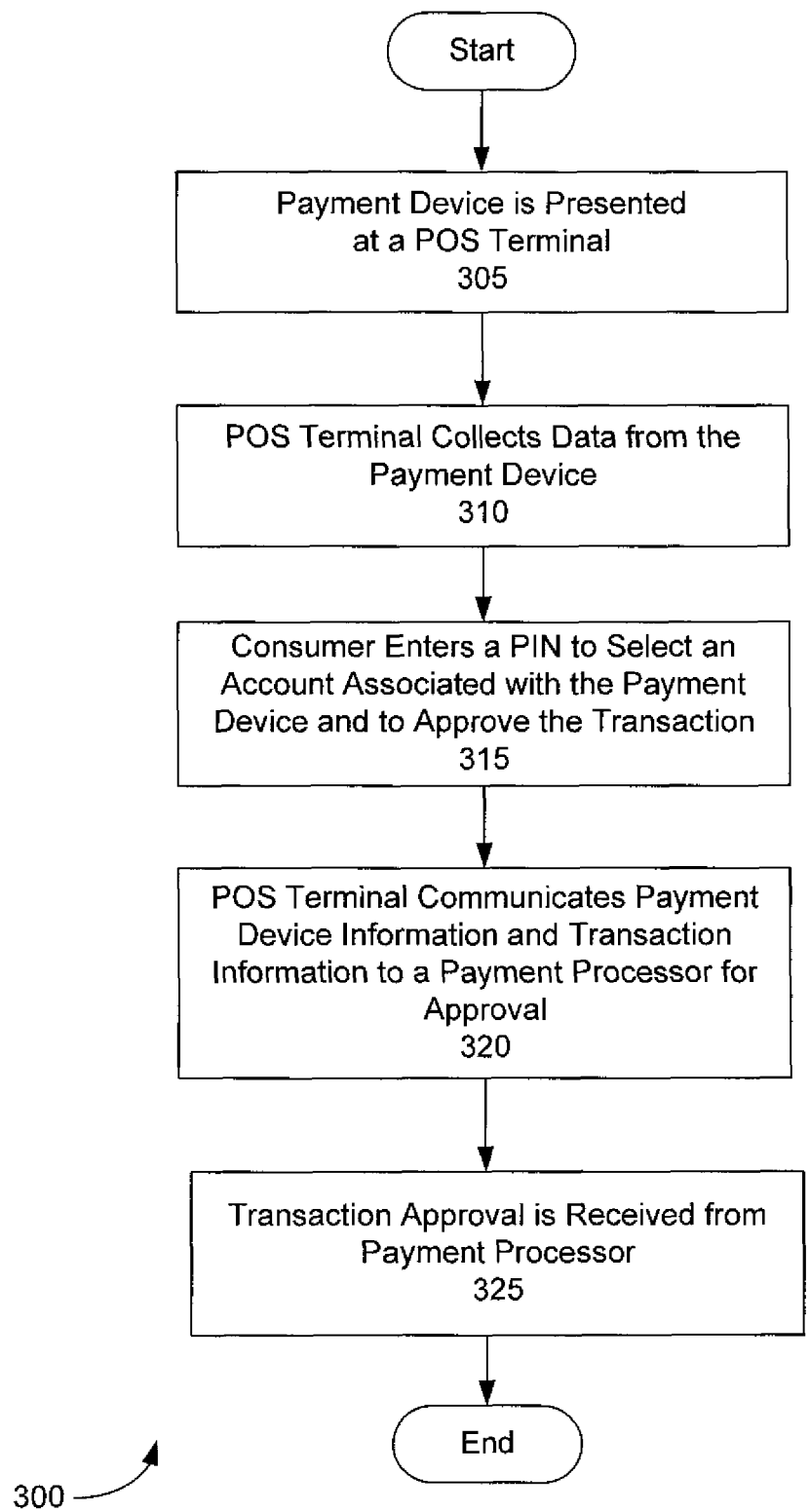

FIG. 3 is a flowchart of one example method for facilitating a payment transaction in accordance with various embodiments of the invention.

Figure 4:
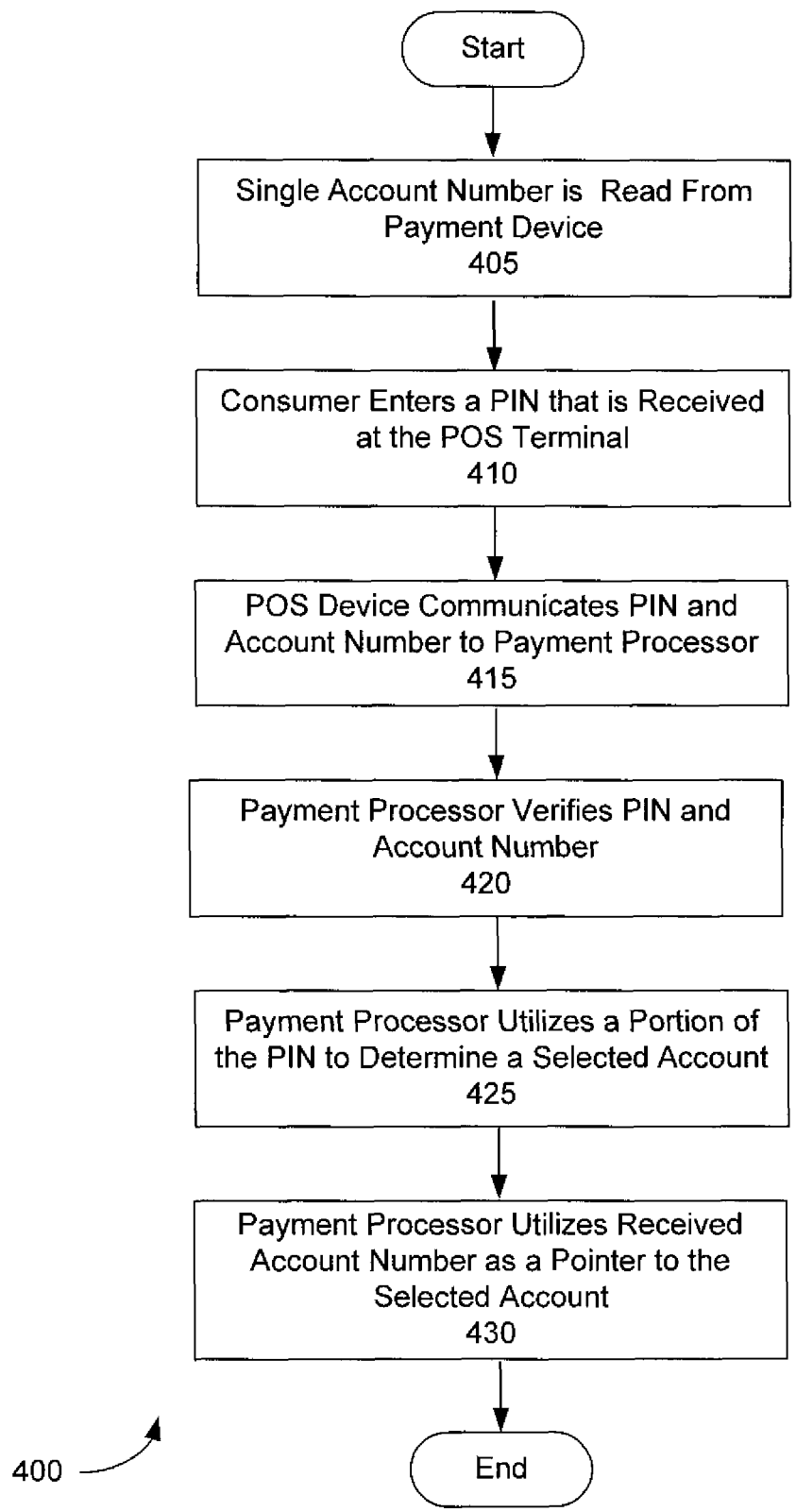

FIG. 4 is a flowchart of one example method for selecting a payment account and utilizing the selected payment account to facilitate a payment transaction, according to an illustrative embodiment of the invention.

Figure 5:
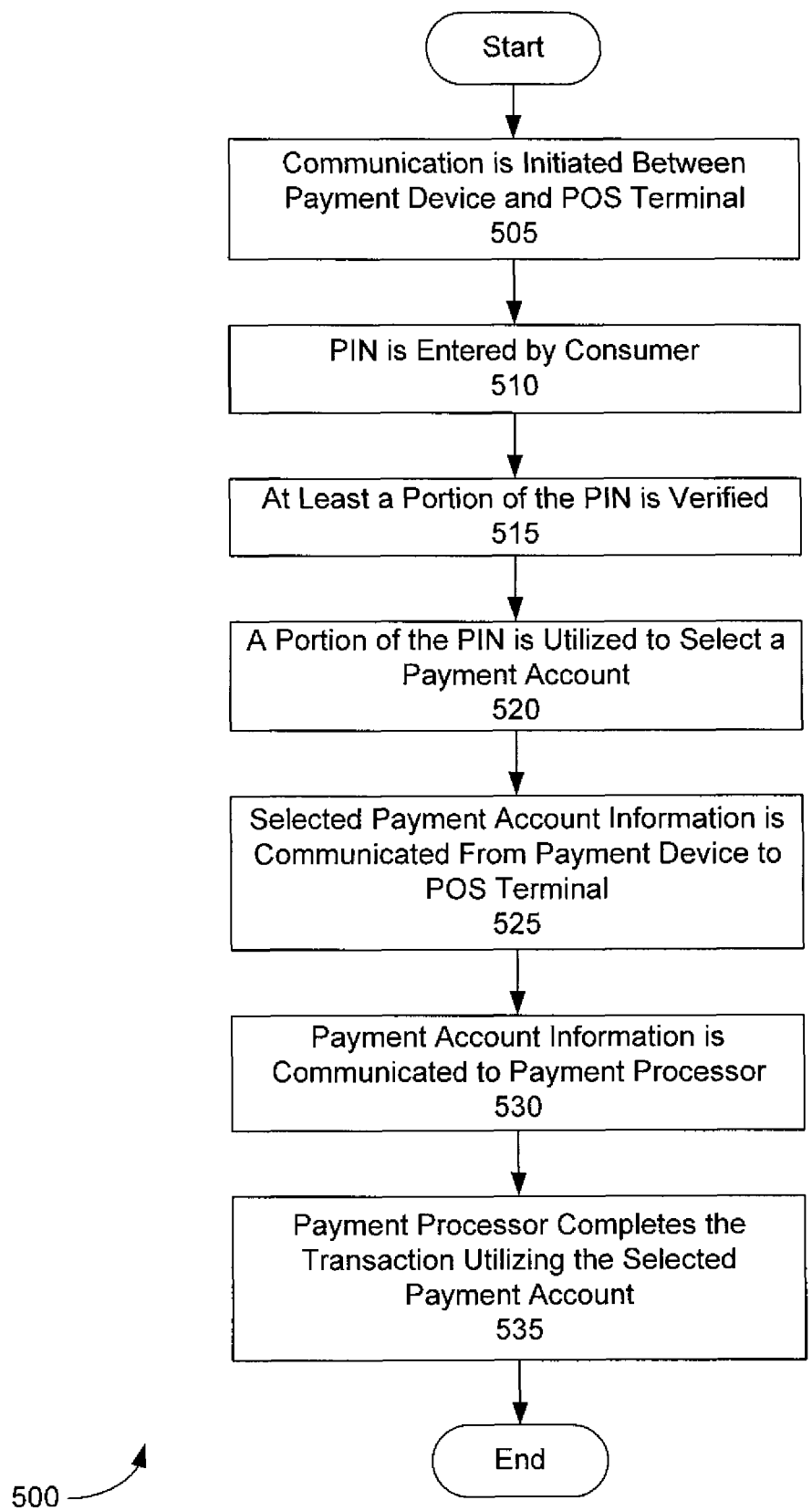

FIG. 5 is a flowchart of another example method for selecting a payment account and utilizing the selected payment account to facilitate a payment transaction, according to an illustrative embodiment of the invention.

Figure 6:
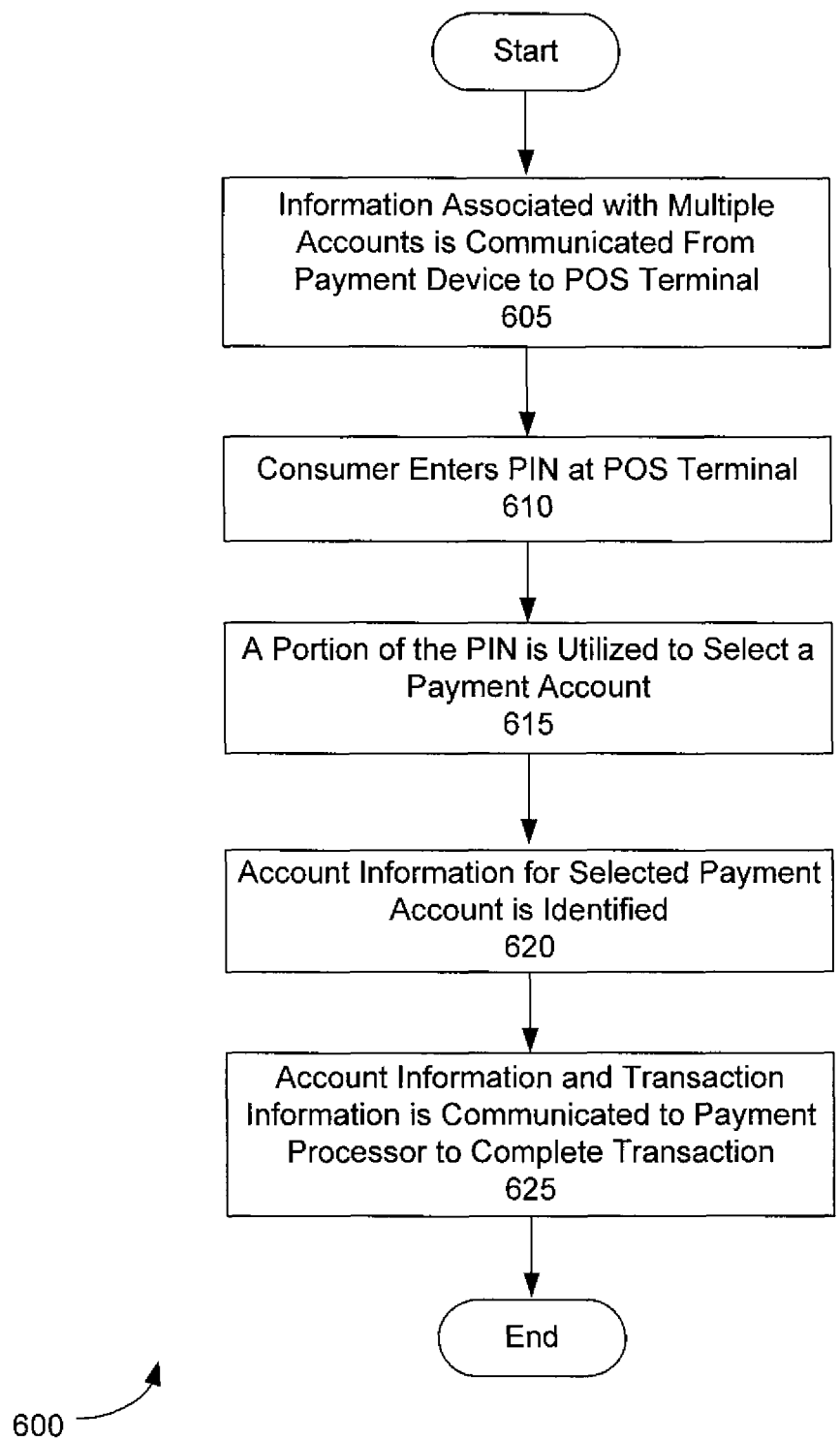

FIG. 6 is a flowchart of yet another example method for selecting a payment account and utilizing the selected payment account to facilitate a payment transaction, according to an illustrative embodiment of the invention.

Figure 7:
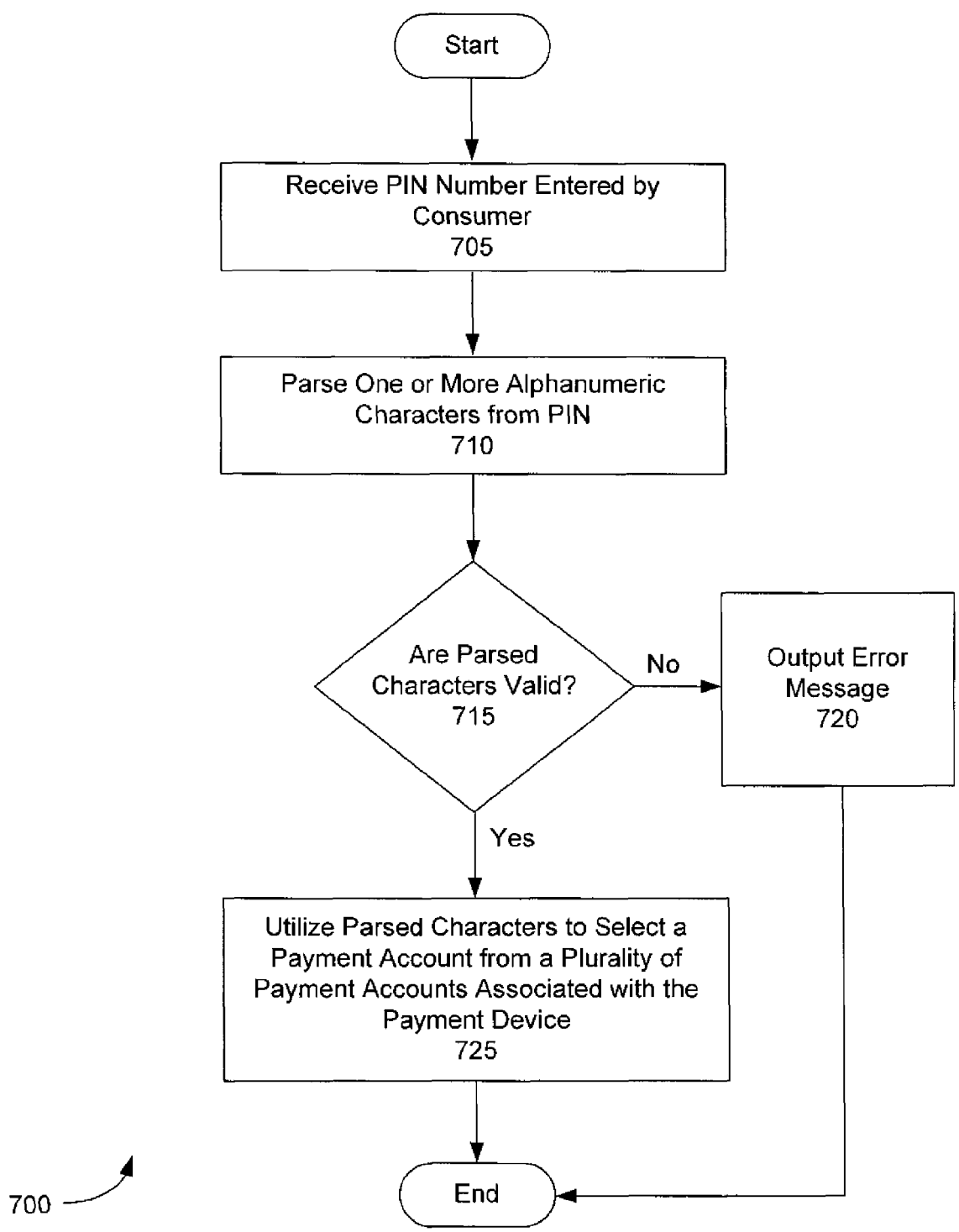

FIG. 7 is a flowchart of one example method for selecting a payment account, according to an illustrative embodiment of the invention.

Figure 8:
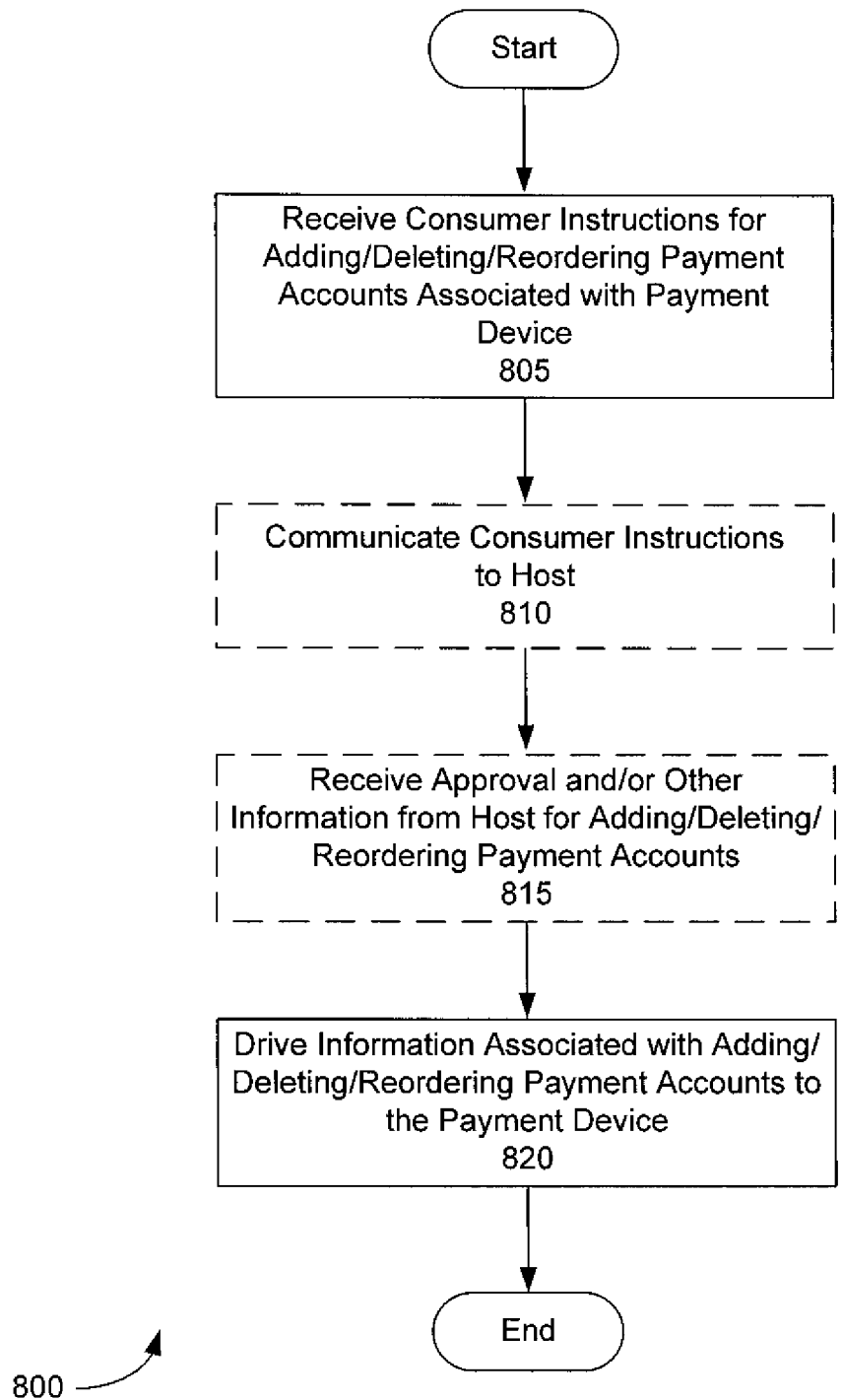

FIG. 8 is a flowchart of one example method for adding or removing information associated with a payment account from a payment instrument, according to an illustrative embodiment of the invention.

Figure 9:
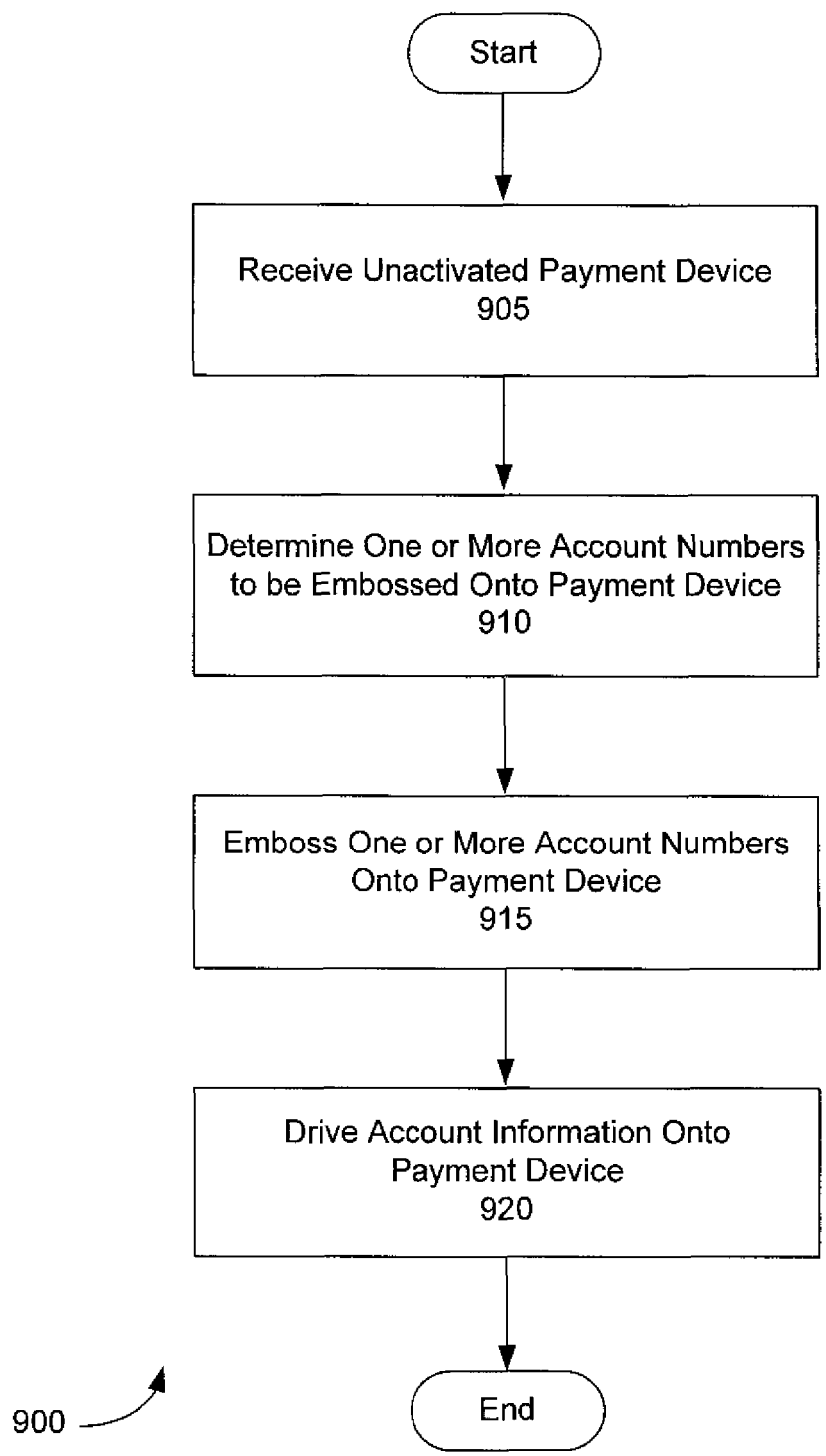

FIG. 9 is a flowchart of one example method for embossing a payment instrument with information associated with one or more payment accounts, according to an illustrative embodiment of the invention.

DETAILED DESCRIPTION OF EMBODIMENTS OF THE INVENTION

Example embodiments of the invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "payment device" and "payment instrument" may be used interchangeably, and refer to any suitable or appropriate device that may be associated with one or more accounts utilized by a consumer to facilitate a transaction. Examples of payment devices include, but are not limited to, magnetic stripe cards, contactless cards, contactless chips, smart cards, mobile communication devices (e.g., cell phones), and personal digital assistants.

As used herein, the term "payment account" refers to any suitable account that may be utilized to facilitate and/or complete a payment transaction. Examples of payment accounts include, but are not limited to, credit card accounts, debit card accounts, stored value accounts, and gift card accounts. The terms "payment account," "account," and "transaction account" may be used interchangeably.

As used herein, the term "payment transaction" refers to any transaction that may be made by a consumer using a suitable payment device. One example of a payment transaction is a purchase transaction. Additionally, the terms "payment transaction," "transaction," "purchase transaction," and "cashless transaction" may be used interchangeably.

In accordance with example embodiments of the invention, systems, methods and apparatus for selecting a payment account for completing a transaction are provided. A payment device, for example, a payment card, may be associated with a plurality of payment accounts. The payment device may be presented at a point of sale device during a transaction and data may be collected from the payment device by the point of sale device. Additionally, a personal identification number (PIN) associated with the payment device may be collected by either the payment device or the point of sale device. A portion of the PIN, for example, a first digit or character of the PIN, may be utilized to select at least one of the plurality of payment accounts associated with the payment device. The transaction may then be facilitated, verified, and/or completed utilizing the selected one or more payment accounts. For example, a payment device may be associated with a two different credit card accounts. A portion of an entered PIN may be utilized to select one of the associated credit card accounts, and the transaction may be completed utilized the selected credit card account.

FIG. 1 is a schematic diagram of one example payment system 100, according to an illustrative embodiment of the invention. The payment system 100 may be utilized to facilitate any suitable payment transaction, for example, a point of sale payment transaction. The payment system 100 may include a payment device 105, a point of sale (POS) terminal 110, and one or more suitable payment processors 115.

The payment device 105 may be any suitable or appropriate device that may be utilized by a consumer, such as consumer 125, to facilitate a transaction. In one example embodiment, the payment device 105 may be a payment card (e.g., credit card, debit card, etc.). The payment card may be a magnetic stripe payment card or a contactless payment card. In another example embodiment, the payment device 105 may be a contactless payment device, for example, an integrated circuit (IC) chip coupled to an appropriate antennae and/or transceiver. In yet another example embodiment, the payment device 105 may be a mobile communication device (e.g. cellular phone) that includes suitable functionality for facilitating a payment transaction.

A wide variety of different payment devices 105 may be utilized as desired in various embodiments of the invention. Additionally, the various types of payment devices may include different components. For example, a magnetic stripe payment card may include a plastic card housing with a magnetic stripe or magnetic tape affixed to the housing. The magnetic stripe may store information associated with one or more payment accounts. As another example, a contactless card or other contactless payment device may include an IC chip in communication with an appropriate antennae and/or transceiver that facilitates communication between the contactless card and a POS terminal/device. The IC chip may include one or more suitable memory components that facilitate the storage of data, such as, account numbers and/or customer data, associated with the completion of transactions. Certain IC chips may also include a processor that executes one or more suitable algorithms and/or applications associated with the completion of transactions, for example, an application that manages communications between the contactless card and the POS terminal/device and/or an encryption algorithm that is utilized to secure communications. Additionally, the contactless card may include a power source, such as a battery. Alternatively, the contactless card may be powered by an appropriate signal received from the POS terminal/device.

According to an aspect of the invention, multiple payment accounts may be associated with the payment device 105. A wide variety of different types of payment accounts may be associated with the payment device 105, for example, credit card accounts, debit card accounts, stored value accounts, gift card accounts, etc. Any number of payment accounts may be associated with a payment device 105 as desired in various embodiments of the invention.

According to another aspect of the invention, a personal identification number (PIN) may be associated with the payment device 105. The PIN may facilitate both the verification of a user of the payment device 105 and the selection of one or more of the plurality of payment accounts associated with the payment device 105. A first portion of the PIN may facilitate the selection of one or more payment accounts for a transaction. The first portion of the PIN may be one or more characters or digits that may be utilized to determine a user selection of one or more payment accounts. The first portion of the PIN may include any number of characters or digits as desired in various embodiments of the invention. For example, the first portion of the PIN may be a single character or digit that facilitates the selection of a payment account. As one example, if the first portion of an entered PIN is a "one," then a first payment account associated with a payment device may be selected. Similarly, if a first portion of an entered PIN is a "two," then a second payment account associated with the payment device may be selected. A similar procedure may be utilized for other payment accounts associated with the payment device.

A second portion of the PIN, for example, four characters or four digits of the PIN, may facilitate the verification of the user of the payment device 105. The second portion of the PIN may be similar to a conventional four digit PIN that is utilized to verify a user and/or a payment account for a transaction.

In certain embodiments of the invention, a user may enter the PIN during a transaction. The entered PIN may include both the first portion and the second portion. The first portion of the PIN may be parsed off of the PIN or otherwise identified, and the first portion may be utilized in a selection of one or more payment accounts. The remaining second portion of the PIN may be utilized in a verification of the user and/or the payment device.

The designation of the various portions of the PIN as a first portion and a second portion is provided by way of example only and does not necessarily designate the order or arrangement of the various portions within the PIN. In certain embodiments of the invention, the first portion of the PIN may be situated at the beginning of the PIN, for example, the first digit or character of the PIN. However, in other embodiments of the invention, the first portion of the PIN may be situated at another place in the PIN, for example, at the end of the PIN. The PIN utilized in various embodiments of the invention may include more characters and/or digits than a convention PIN. Accordingly, for purposes of this disclosure the PIN may also be referred to as an "expanded PIN."

With continued reference to FIG. 1, the POS terminal/device 110 may include any number of suitable devices and/or systems that facilitate the collection of information from the payment device 105 and the processing of the payment transaction. For example, the POS terminal/device 110 may include one or more data collection devices and/or input/output (I/O) interfaces that facilitate the collection of information associated with the payment device 105 and/or the payment transaction. The POS terminal/device 110 may utilize at least a portion of the collected data to process the payment transaction.

The POS terminal/device 110 may be any processor-driven device or plurality of devices, such as a special purpose computer, a personal computer, laptop computer, handheld computer, server and the like, that is configured to process a transaction at a point of sale. In certain embodiments, the operations of the POS terminal/device device 110 may be controlled by computer-executed or computer-implemented instructions that are executed by one or more processors associated with the POS terminal/device device 110. The instructions may be embodied in one or more software components as desired in various embodiments of the invention. The execution of the instructions may form a special purpose computer or other particular machine that is operable to process a transaction at a point of sale. The POS terminal/device 110 may include at least one processor 141, a memory 142, one or more payment device readers 143, one or more input/output ("I/O") interface(s) 144, and one or more network interfaces 145. The memory 142 may store data files 146 and various program modules, such as an operating system ("OS") 147, a database management system ("DBMS") 148, a payment processing module 149, and a communications module 150. The payment processing module 149 may receive information associated with a transaction, for example, information associated with the payment device 105 and/or information associated goods or services that are being purchased. The payment processing module 149 may process the transaction utilizing at least a portion of the information. The communications module 150 may facilitate communication with one or more other components of the payment system 100, such as, one or more payment processors 115 and/or one or more third party data sources 135. The DBMS 148 may facilitate management of one or more databases 130 that may be utilized by the POS terminal/device 110 to process transactions and/or to store information associated with one or more transactions.

The one or more payment device readers 143 may include any number of suitable devices operable to collect information from the payment device 105. Examples of payment device readers 143 include, but are not limited to, magnetic stripe readers, bar code readers, RFID transceivers and/or other RFID communication devices, bluetooth transceivers and/or other Bluetooth communication devices, and/or near field communication (NFC) devices. In certain embodiments, the one or more payment device readers 143 may initiate communication with the payment device 105 during a transaction, and the one or more device readers 143 may collect or otherwise receive information from the payment device 105 during the transaction.

The one or more I/O interfaces 144 may facilitate communication between the POS terminal/device 110 and one or more input/output devices, for example, a display, keyboard, keypad, mouse, control panel, touch screen display, microphone, etc. that facilitate user interaction with the POS terminal/device 110. The one or more input/output devices may be utilized to collect information from any user of the POS terminal/device 110, for example, a clerk or sales associate operating the POS terminal/device 110. The one or more input/output devices may also be utilized to collect information from a consumer 125 associated with the payment device 105. For example, a suitable input/output device, such as a keypad, may facilitate the entry of a PIN by the consumer 125 during a transaction.

The one or more network interfaces 145 may facilitate connection of the POS terminal/device 110 to one or more suitable networks 120, for example, a local area network, a wide area network, the Internet, a telephone network, a cellular network, etc. Additionally, other components may be included in the POS terminal/device 110 as desired in various embodiments of the invention.

The POS terminal/device 110 may include and/or be associated with any number of suitable memory devices, such as, databases 130, that facilitate the storage of data utilized to process a transaction and/or the storage of data associated with processed transaction. A wide variety of different information may be stored in the databases 130 as desired in various embodiments of the invention. For example, a database associated with the POS terminal/device 110 may include a list of consumers and/or payment accounts for which a merchant or other entity associated with the POS terminal/device 110 will not process a transaction. This information may be accessed during a transaction and compared to information received from the payment device 105 and/or the consumer 125 associated with the payment device in order to determine whether or not the POS terminal/device 110 will process the transaction. As another example, a database associated with the POS terminal/device 110 may be utilized to store information associated with a processed transaction, for example, information associated with an amount of a transaction and/or information associated with goods or services that were purchased in a transaction. In this regard, historical information associated with transactions can be collected and stored. This historical information may be utilized for a wide variety of different purposes, for example, targeted advertisement and/or offering special promotions, incentives, and/or rewards to a consumer. In certain embodiments of the invention, advertisements, promotions, incentives, and/or rewards may be communicated to the payment device 105 by the POS terminal/device 110.

The one or more payment processors 115 may include any number of suitable processing systems and/or processing devices that are in communication with the POS terminal/device 110 and that facilitate processing of a transaction. In certain embodiments of the invention, the one or more payment processors 115 may include one or more systems and/or devices that facilitate back-end processing of a transaction. For example, the one or more payment processors 115 may include one or more credit card processing system, one or more debit card processing system, one or more stored value card processing systems, one or more financial institutions, etc. Each or the one or more payment processors 115 may be an appropriate processor driven device that facilitates processing of a transaction.

During a transaction, the POS terminal/device 110 may collect information associated with the transaction, for example, a transaction amount and information associated with the payment device 105. Utilizing the communications module 150 and the one or more network interfaces 145, the POS terminal/device 110 may communicate at least a portion of the collected information to a payment processor 115 via the one or more networks 120. The payment processor 115 may evaluate the received information and determine whether the transaction may be approved or denied. During an evaluation of the received information, the payment processor 115 may access additional payment processor as desired in various embodiments of the invention. As an example of an evaluation, when a credit card account is selected for the transaction, a payment processor may verify the account number of the credit card account and/or the credit limit of the credit card account. As another example, when a debit card account is selected for the transaction, a payment processor may verify the account number of the debit card account and/or the account balance of the debit card account. The determination of whether to approve or deny a transaction may include any number of suitable risk determinations as desired in various embodiments of the invention. Once a determination has been made by a payment processor 115 to approve or deny a transaction, an indication of approval or denial may be communicated to the POS terminal/device 110. The transaction may then be completed at the point of sale. Either before or after the indication of approval or denial is communicated to the POS terminal/device 110, the payment processor 115 may direct, request, or otherwise facilitate the transfer of funds associated with the transaction. For example, in a debit card transaction, the payment processor 115 may direct a debit of a demand deposit account (DDA) associated with the consumer 125 and a credit of an account associated with an operator of the POS terminal/device 110, such as a merchant.

In certain embodiments of the invention, the PIN may be communicated to a payment processor 115 by the POS terminal/device 110. In some embodiments of the invention, the payment processor 115 may verify the PIN. Additionally, in certain embodiments, the payment processor 115 may communicate an indication of whether the PIN was verified to the POS terminal/device 110. Additionally, in certain embodiments of the invention, the payment processor 115 may utilize the PIN to select a payment account for the transaction. The selection of a payment account by the payment processor 115 based at least in part on the PIN is discussed in greater detail below with reference to FIG. 4.

With continued reference to FIG. 1, in certain embodiments of the invention, the payment system 100 may include one or more third party data sources 135. The third party data sources 135 may include any number of suitable processing systems and/or processing devices that facilitate a risk determination of whether or not to accept or deny a payment transaction. In this regard, the third party data sources 135 may be in communication with the POS terminal/device 110 and/or the one or more payment processors 115 via the one or more networks 120. One or more of the third party data sources 135 may receive a request for a risk determination associated with the transaction or a request for information that may be utilized in a risk determination. In response to a received request, the third party data sources 135 may communicate a risk determination and/or requested information to a requesting entity, for example, a payment processor 115 or the POS terminal/device 110. A wide variety of different risk determinations and/or other analysis may be performed by a third party data source 135 as desired in various embodiments of the invention. As an example, the POS terminal/device 110 may communicate information associated with the consumer 125 and/or a selected payment account to a third party data source 135 along with a request for a risk determination associated with the transaction. In response to the request, the third party data source 135 may conduct one or more risk analyses for the transaction and communicate the results of the one or more risk analyses to the POS terminal/device 110. The POS terminal/device 110 may receive the results from the third party data source 135 and utilize the received results in a determination of whether or not to process the transaction.

FIG. 2 is a schematic diagram of one example payment instrument 200 that may be utilized in accordance with various embodiments of the invention. The payment instrument 200 illustrated in FIG. 2 is an example plastic card, for example, a plastic credit card that may be utilized in various embodiments of the invention. As explained in greater detail above, other types of payment instruments or payment devices may be utilized as desired in other embodiments of the invention.

With reference to FIG. 2, the payment instrument 200 may include indications 205, 210, 215 of a plurality of payment accounts associated with the payment instrument 200. These indications 205, 210, 215 may be embossed, printed, or otherwise displayed on a surface of the payment instrument 200. Any number of indications of payment accounts may be associated with the payment instrument 200 as desired in various embodiments of the invention. These indications 205, 210, 215 may include respective account numbers associated with each of the plurality of payment accounts. Additionally and/or alternatively, these indications 205, 210, 215 may include other identifying information associated with each of the plurality of payment accounts, for example, a respective name associated with each account. As one example, a first indication 205 may indicate that a first account associated with the payment instrument 200 is a MASTERCARD™ credit card account. The first indication 205 may additionally and/or alternatively identify an account number associated with the first account. Continuing with the example, the second indication 210 may indicate that a second account associated with the payment instrument is VISA™ branded or bank branded debit card account. The second indication 210 may additionally and/or alternatively identify an account number associated with the second account. Similarly, the third indication 215 may indicate that the third account associated with the payment instrument is a stored value account, for example, a stored value account associated with a retailer (e.g., a gift card account). The third indication 215 may additionally and/or alternatively identify an account number associated with the third account.

In addition to indications 205, 210, 215 associated with a plurality of payment accounts, the payment instrument 200 may include a wide variety of other information that is embossed, printed, or otherwise displayed on the payment instrument. For example, the payment instrument 200 may include the customer's name 220 and/or an expiration date 225 associated with the payment instrument. The expiration date 225 may be an expiration date for one or more of the plurality of accounts associated with the payment instrument 200, for example, an expiration date for the first account associated with the payment instrument 200. Alternatively, respective expiration dates may be provided for various accounts associated with the payment instrument. The payment instrument 200 may additionally include branding information 230 associated with the issuer of the payment instrument 200. A wide variety of different branding information 230 may be included on the payment instrument 200 as desired in various embodiments. For example, the branding information 230 may be associated with a financial institution that issues and/or manages one or more of the plurality of payment accounts.

With continued reference to FIG. 2, the payment instrument 200 may include a magnetic stripe 235 that is operable to store information associated with the plurality of payment accounts. At least a portion of the stored information may be read from the magnetic stripe 235 by a suitable magnetic stripe reader, for example, a magnetic stripe reader associated with the POS terminal/device 110 illustrated in FIG. 1. The payment instrument 200 may additionally or alternatively include an integrated circuit (IC) chip 240 that stores information associated with the plurality of payment accounts. The IC chip 240 may also include or be in communication with a wireless transceiver that facilitates contactless communication (e.g., RFID, bluetooth, and/or NFC communication) between the payment instrument 200 and a POS terminal/device 110.

As discussed above, the payment instrument 200 illustrated in FIG. 2 is only one example of a payment instrument that may be utilized in accordance with various embodiments of the invention. Other types of payment instruments or payment devices may include different components. Additionally, other types of payment devices may utilize a wide variety of different devices and/or techniques to display information associated with a plurality of payment accounts. For example, a mobile communication device (e.g., cellular phone) may utilize an appropriate output device, such as an liquid crystal display (LCD), to display information associated with a plurality of payment accounts. Additionally, in some embodiments, a payment device or payment instrument may not display information associated with one or more of the plurality of payment accounts.

FIG. 3 is a flowchart of one example method 300 for facilitating a payment transaction in accordance with various embodiments of the invention. The method 300 may include collecting data associated with a payment transaction and utilizing at least a portion of the collected data to select one or more payment accounts for the payment transaction. The transaction may then be facilitated and/or completed utilizing the selected one or more payment accounts.

The method 300 may begin at block 305. At block 305, a payment device, such as payment device 105, may be presented at a POS terminal/device, such as POS terminal/device 110, as part of a transaction. For example, the payment device 105 may be presented in response to a request for a form of payment during a transaction. Once the payment device 105 is presented at block 305, operations may continue at block 310 and the POS terminal/device 110 may collect data from the payment device 105. A wide variety of different types of collection devices and/or readers may be utilized by the POS terminal/device 110 as desired in various embodiments of the invention to collect data from the payment device 105, for example, magnetic stripe readers, RFID transceivers, etc. In some embodiments, the data collection devices and/or readers may initiate communication with the payment device 105; however, in other embodiments, the communication may be initiated by the payment device 105. Additionally, a wide variety of different information may be collected from the payment device 105, for example, information associated with a consumer, such as consumer 125, utilizing the payment device 105, information associated with one or more of a plurality of accounts associated with the payment device 105, and/or information utilized in a verification of the payment device 105.

In some embodiments, information may be collected from the payment device 105 in a single communication. However, in other embodiments, information may be collected from the payment device 105 in a plurality of separate communications. The separate communications may be facilitated by a single communications session or by multiple communications sessions that are established between the payment device 105 and the POS terminal/device 110. Additionally, in certain embodiments of the invention, communications between the payment device 105 and the POS terminal/device 110 are encrypted. Some example embodiments of collecting information from a payment device 105 for a transaction are described in greater detail below with reference to FIGS. 4-6.

At block 315, a PIN is entered by a consumer 125 associated with the payment device 105. The PIN may be entered by the consumer 125 utilizing one or more suitable input/output devices associated with the POS terminal/device 10, for example, a keypad, a touch screen display, or the like. Alternatively, the PIN may be entered by the consumer 125 utilizing one or more suitable input/output devices associated with the payment device 105, for example, a keypad, a touch screen display, or the like. A first portion of the PIN may be utilized to select one or more payment accounts and a second portion of the PIN may be utilized to verify the consumer 125.

According to an aspect of the invention, a first portion of the PIN may be utilized to select one or more payment accounts for the transaction. As one example, the first character or first digit of the PIN may be utilized to select one or more payment accounts for the transaction. The identification of the selected one or more payment accounts for the transaction may be made by the payment device 105, by the POS terminal/device 110, by a payment processor, such as payment processor 115, or by another entity or device as desired in various embodiments of the invention. Examples of identifying the selected one or more payment accounts are provided in greater detail below with reference to FIGS. 4-7. If the PIN is entered into the payment device 105, then the payment device 105 may utilize the first portion of the PIN to identify the one or more selected payment accounts. Additionally or alternatively, the first portion of the PIN may be communicated to the POS terminal/device 110 and, in some embodiments, to the payment processor 115, to facilitate an identification of the one or more selected payment accounts.

The second portion of the PIN may be utilized to verify the consumer 125. As one example, the last four digits or characters may be utilized to verify the consumer 125. The verification of the consumer 125 may be made by the payment device 105 and/or by a payment processor, such as payment processor 115. In certain embodiments, the PIN may be utilized to verify that the consumer 125 is authorized to use a selected payment account to complete a transaction. If the PIN is entered into the payment device 105, then the payment device 105 may utilize the second portion of the PIN to verify the consumer 125. Additionally or alternatively, at least the second portion of the PIN may be communicated to the POS terminal/device 110 and then communicated to the payment processor 115 for verification of the consumer 125. If the PIN is entered at the POS terminal/device 110, then the POS terminal/device 110 may communicate at least the second portion of the PIN to the payment device 105 and/or to the payment processor 115 in order to facilitate verification of the consumer 125.

Once the POS terminal/device 110 has collected data from the payment device at block 310 and the PIN has been entered at block 315, then operations may continue at block 320. At block 320, the POS terminal/device 110 may communicate collected payment device data or information, at least a portion of the PIN, and/or transaction information (e.g., transaction amount) to the payment processor 115 for approval and/or processing of the payment transaction. The payment processor 115 may utilize at least a portion of the received data in a determination of whether or not the payment transaction should be approved by the POS terminal/device 110. For example, the payment processor 115 may determine whether the one or more selected accounts include sufficient funds or a sufficient line of credit to cover the transaction amount associated with the transaction. As another example, the payment processor 115 may utilize at least a portion of the PIN to determine whether the consumer 125 is authorized to use one or more selected payment accounts to complete a transaction. An indication of whether to approve or deny the transaction may be received by the POS terminal/device 110 from the payment processor 115 at block 325. If the transaction is approved, then the POS terminal/device 110 and the payment processor 115 may facilitate completion of the transaction. An indication of the approval may be displayed at the POS terminal/device 110 and/or at the payment device 105. If, however, the transaction is denied, then an appropriate indication of the denial may be displayed at the POS terminal/device 110 and/or at the payment device 105.

In the event that the transaction is denied, the POS terminal/device 110 and/or the payment device 105 may additionally display a suggestion of utilizing a different payment account for the transaction. In some embodiments, the POS terminal/device 110 and/or the payment device 105 may select one or more payment accounts to utilize for the transaction. As one example, if a stored value account associated with a merchant that operates the POS terminal/device 110 is associated with the payment device 105, then an identification of the stored value account may be displayed with a suggestion of utilizing the stored value account. Additionally, an indication of the order or placement of the stored value account among the plurality of accounts associated with the payment device 105 may be displayed, for example, an indication that the stored value account is the first account, second account, etc.

The method 300 may end following block 325.

In the description of FIG. 3 above, the approval of the payment transaction by a payment processor 115 is described as including communications between the POS terminal/device 110 and the payment processor 115. In certain embodiments of the invention, for example, embodiments that include a mobile communication device as a payment device, at least a portion of the communications described above with reference to FIG. 3 as occurring between the POS terminal/device 110 and the payment processor 115 may occur between the payment device 105 and the payment processor 115. For example, the payment device 105 may communicate information associated with the transaction and/or information associated with a selection of one or more payment accounts to the payment processor 115. The payment processor 115 may then determine whether the transaction should be approved and communicate an indication of whether the transaction should be approved to the payment device 105 and/or to the POS terminal/device 110.

FIG. 4 is a flowchart of one example method 400 for selecting a payment account and utilizing the selected payment account to facilitate a payment transaction, according to an illustrative embodiment of the invention. Although only a single payment account is described as being selected in FIG. 4, in certain embodiments of the invention, multiple payment accounts may be selected.

The method 400 may begin at block 405. At block 405, a single account number may be read from a payment device, such as payment device 105, or otherwise communicated to a POS terminal/device, such as POS terminal/device 110, by the payment device 105. In certain embodiments, the single account number may be a generic account number associated with the payment device 105. The single account number may not be the account number for any of the plurality of payment accounts associated with the payment device 105. In this regard, the security of the account numbers for the plurality of payment accounts associated with the payment device 105 may be enhanced and/or maintained.

At block 410, a consumer associated with the payment device 105, such as consumer 125, may enter a PIN that is received by the POS terminal/device 110. The PIN may be entered at the POS terminal/device 110 or communicated to the POS terminal/device 110 as desired in various embodiments of the invention. A first portion of the PIN may be utilized to identify a payment account that the consumer 125 desires to utilize for the transaction, and a second portion of the PIN may be utilized to verify the consumer 125.

At block 415, the POS terminal/device 110 may communicate the PIN and account number to a payment processor, such as payment processor 115. The POS terminal/device 110 may also communicate other transaction data to the payment processor 115 as desired in various embodiments of the invention, for example, a transaction amount. The payment processor 115 may verify the PIN and/or the account number at block 420. For example, the payment processor 115 may verify the consumer 125 utilizing the second portion of the PIN. The payment processor 115 may also verify that the account number is associated with the consumer 125 and/or the payment device 105. Additionally, as desired, the payment processor 115 may utilize the PIN to verify that the consumer 125 is authorized to use a selected payment account to complete a transaction. Although the verification of the PIN is described as being carried out by the payment processor 115, in certain embodiments of the invention, the verification of the PIN may be additionally or alternatively carried out by the payment device 105.

At block 425, the payment processor 115 may utilize the second portion of the PIN to identify or otherwise determine a payment account selected by the consumer 125 for the transaction. As one example, the second portion of the PIN may be a first character or a first digit of the PIN. The payment processor 115 may parse this first character or first digit off of the PIN, and the payment processor 115 may identify a selected account utilizing the first character or first digit. Continuing with the example, if the first digit of the PIN is a "1", then the first payment account associated with the payment device 105 may be identified as a selected payment account; if the first digit of the PIN is a "2", then the second payment account associated with the payment device 105 may be identified as a selected payment account; and so on. If the PIN does not include a first portion that can be parsed off (e.g., only a four digit PIN is enter), then the payment processor 115 may determine that no selection of a payment account has been made. The payment processor 115 may select a default payment account for the transaction, for example, a first payment account associated with the payment device 105.

Once a determination of the selected payment account is made at block 425, operations may continue at block 430. At block 430, the payment processor 115 may utilize the received account number and/or the second portion of the PIN as a pointer to the selected payment account. For example, the account number may be utilized as a pointer to a matrix, list, or other memory storage structure that stores the payment accounts associated with the payment device 105. The second portion of the PIN may be utilized to select a payment account from a list of the payment accounts associated with the payment device 105, and the selected payment account may be utilize to facilitate and/or complete the transaction. In this regard, account numbers for the plurality of payment accounts associated with a payment device 105 do not need to be stored on the payment device 105. Accordingly, the security of the account numbers may be enhanced.

The method 400 may end following block 430.

FIG. 5 is a flowchart of another example method 500 for selecting a payment account and utilizing the selected payment account to facilitate a payment transaction, according to an illustrative embodiment of the invention. Although only a single payment account is described as being selected in FIG. 5, in certain embodiments of the invention, multiple payment accounts may be selected.

The method 500 may begin at block 505. At block 505, communication may be initiated between a payment device, such as payment device 105, and a POS terminal/device, such as POS terminal/device 110. A PIN may be entered by the consumer at block 510. The PIN may be entered utilizing one or more suitable input devices associated with the POS terminal/device 110 or by utilizing one or more suitable input devices associated with the payment device 105.

At block 515, at least a portion of the PIN is verified. The PIN may be verified by the payment device 105 and/or by one or more payment processors, such as payment processors 115. In the event that the verification of the PIN is conducted by the payment device 105, at least a portion of the PIN may be communicated to the payment device 105 if the PIN is not entered at the payment device 105. The verification of the PIN may verify the consumer 125 associated with the payment device 105. For example, the last four digits of the PIN may be compared to a prestored expected PIN verification value associated the payment device 105, and the PIN may be verified based at least in part on the comparison. Additionally, as desired, the PIN may be utilized to verify that the consumer 125 is authorized to use a selected payment account to complete a transaction.

At block 520, a portion of the PIN may be utilized to select a payment account from a plurality of payment accounts associated with the payment device 105. As one example, a first character or first digit of the PIN may be utilized to select a payment account. If it is determined that the first character or first digit of the PIN has not been entered by the consumer, then a default payment account may be selected. In embodiments of the invention in which the PIN is entered at the payment device 105, the payment device 105 may parse the PIN and utilize a first portion of the PIN to determine a selected payment account. In embodiments of the invention in which the PIN is entered at a POS terminal/device 110, the POS terminal/device 110 may parse the PIN and determine an indicator (e.g., first character or digit) associated with the selected payment account. The indicator may then be communicated to the payment device 105 in a request for information associated with the selected payment account.

Once a determination of a selected payment account has been made at block 520, then operations may continue at block 525. At block 525, information associated with the selected payment account, for example, an account number of the selected payment account, may be communicated from the payment device 105 to the POS terminal/device 110. The selected payment account information may then be communicated to the payment processor 115 by the POS terminal/device 110 at block 530. Alternatively, in some embodiments of the invention, the selected payment account information may be communicated directly to the payment processor 115 by the payment device 105, and the selected payment account information may not be communicated to the POS terminal/device 110.

At block 535, the payment processor 115 may utilize the selected payment account information in order to facilitate and/or complete the transaction. For example, the payment processor 115 may verify the account number associated with the selected payment account and/or determine whether or not the transaction should be approved. An indication of whether or not to approve the transaction may be communicated to the POS terminal/device 110 and/or to the payment device 105 as desired in various embodiments of the invention.

The method 500 may end following block 535.

FIG. 6 is a flowchart of yet another example method 600 for selecting a payment account and utilizing the selected payment account to facilitate a payment transaction, according to an illustrative embodiment of the invention. Although only a single payment account is described as being selected in FIG. 6, in certain embodiments of the invention, multiple payment accounts may be selected.

The method 600 may begin at block 605. At block 605, information associated with multiple payment accounts associated with a payment device, such as payment device 105, may be communicated to a POS terminal/device, such as POS terminal/device 110. The information associated with multiple payment accounts may include information associated with each of the respective plurality of payment accounts associated with the payment device 105, including account numbers for each of the plurality of payment accounts.

At block 610, a consumer, such as consumer 125, may enter a PIN at the POS terminal/device 110 utilizing one or more suitable input devices or interface devices, for example, a keypad or touch screen display. At block 615, at least a portion of the entered PIN may be utilized by the POS terminal/device 110 to select a payment account from the plurality of payment accounts. As an example, a first character or digit of the entered PIN may be utilized to select a payment account. If a first character or digit has been omitted (e.g., a four character PIN is entered rather than a five character PIN), then the POS terminal/device 110 may select a default payment account from the plurality of payment accounts, for example, a first payment account from a list of the plurality of payment accounts.

At block 620, account information for the selected payment account may be identified. For example, an account number and/or an expiration date for the selected payment account may be identified. The identified account information and/or other information associated with the transaction (e.g., a transaction amount) may be communicated to a payment processor, such as payment processor 115, at block 625. The account information and/or other transaction information may be utilized by the payment processor 115 in order to facilitate and/or complete the transaction. For example, the payment processor 115 may verify the account number associated with the selected payment account and/or determine whether or not the transaction should be approved. An indication of whether or not to approve the transaction may be communicated to the POS terminal/device 110 and/or to the payment device 105 as desired in various embodiments of the invention.

Additionally, a second portion of the PIN may be communicated to the payment processor 115 as desired in various embodiments of the invention, and the second portion of the PIN (e.g., last four digits of the PIN) may be utilized to verify the consumer 125 associated with the payment device 105. Additionally, as desired, the payment processor 115 may utilize the PIN to verify that the consumer 125 is authorized to use a selected payment account to complete a transaction.

The method 600 may end following block 625.

FIG. 7 is a flowchart of one example method 700 for selecting a payment account utilizing a portion of an entered PIN, according to an illustrative embodiment of the invention. The method 700 relates to parsing a PIN in order to determine a selection of one or more payment accounts to utilize for a transaction.

The method 700 may begin at block 705. At block 705, a PIN that is entered by a consumer associated with a payment device, such as consumer 125, may be received. The consumer 125 may enter the PIN at a payment device, such as payment device 105, or at a POS terminal/device, such as POS terminal/device 110.

Following the receipt of the PIN at block 705, operations may continue at block 710. At block 710, one or more alphanumeric characters may be parsed from the received PIN. The one or more parsed alphanumeric characters may represent a consumer selection of one or more payment accounts to utilize for a transaction. As an example, when entering the PIN, the first number or character of the entered PIN may indicate a selected payment account or payment accounts to utilize for a transaction. In this example, the first number or character may be parsed from the received PIN at block 710. As another example, when entering a PIN, the first two numbers or characters of the entered PIN may indicate a selected payment account or payment accounts to utilize. As yet another example, when entering a PIN, a last number or character, or a last group of numbers or characters may indicate a selected payment account or payment accounts to utilize. Any number of alphanumeric characters of the PIN may be associated with a selection of one or more accounts to utilize for a transaction.

At block 710, a determination may be made as to whether the parsed alphanumeric characters associated with the selection of one or more accounts is valid. For example, a determination may be made as to whether the parsed alphanumeric characters indicate a valid selection of one or more payment accounts. As one example determination, if a payment device 105 is associated with four payment accounts, then the entry of the numbers one, two, three, or four may be determined to indicate a valid account selection; however, the entry of another number or character may be determined to indicate an invalid account selection. In certain embodiments of the invention, the failure to enter one or more alphanumeric characters that may be parsed from the PIN, such as, only entering a standard four digit PIN, may not result in a determination that the parsed alphanumeric characters are invalid. Instead, a default account, for example, a first payment account associated with the payment device 105, may be selected for a transaction.

If it is determined at block 715 that the parsed characters are not valid, then operations may continue at block 720 and an error message may be output and/or displayed indicating that an invalid account selection was made. If, however, it is determined at block 715 that the parsed characters indicate a valid account selection, then operations may continue at block 725. At block 725, the parsed alphanumeric characters may be utilized to select one or more payment accounts from a plurality of payment accounts associated with the payment device 105, and the transaction may be facilitated and/or completed utilizing the one or more selected payment accounts.

A wide variety of different numbers, alphanumeric characters, groups of number, or groups of characters may be utilized in various embodiments of the invention to select one or more payment accounts. For example, if nine or fewer payment accounts are associated with a payment device 105, then the numbers one through nine may be utilized to select a payment account. As another example, if a greater number of payment accounts are associated with a payment device 105, then a two digit number, a letter, or another alphanumeric character may be utilized to select a payment account. For example, a two digit number may be utilized to select up to ninety-nine different payment accounts. As another example, the letter "A" may be utilized to select a tenth payment account, the letter "B" may be utilized to select an eleventh payment account, and so on an so forth. A wide variety of other methods for parsing a PIN to select one or more payment accounts will be apparent to those skilled in the art.

The method 700 may end following block 725.

In certain embodiments of the invention, the plurality of payment accounts associated with a payment device, such as payment device 105, may be altered and/or updated. For example, the payment accounts may be reordered. As another example, additionally payment accounts may be associated with the payment device 105 and/or payment accounts may be disassociated, removed, or deleted from the payment device 105.

In some example embodiments, the addition, deletion, or reordering of payment accounts may be facilitated based at least in part on instructions received from a consumer associated with the payment device 105, such as consumer 125. Consumer instructions may be received utilizing a wide variety of suitable systems, devices, and/or techniques as desired in various embodiments of the invention. In one example, consumer instructions may be received via a world wide web interface in which the consumer 125 may associate accounts with a payment device 105. In another example, consumer instructions may be received via a kiosk, POS terminal/device, or other device. In yet another example, consumer instructions may be received directly at the payment device 105.

Once consumer instructions for addition, deletion, and/or reordering of payment accounts are received, information may be driven onto the payment device 105 that adds, deletes, and/or reorder the plurality of payment accounts associated with the payment device 105. In this regard, the plurality of payment accounts may be altered and/or updated. In some embodiments of the invention, the addition, deletion, and/or reordering of payment accounts may be approved by a host system, such as an issuer of the payment device 105 or a payment processor 115, prior to the alteration or updating of the plurality of payment accounts.

FIG. 8 is a flowchart of one example method 800 for adding or removing information associated with a payment account from a payment instrument, according to an illustrative embodiment of the invention. The method 800 may begin at block 805. At block 805, consumer instructions for adding, deleting, and/or reordering payment accounts associated with a payment device, such as payment device 105, may be received. The consumer instructions may be received utilizing any suitable number of devices, systems, and/or techniques, for example, a world wide web interface, a special purpose kiosk, or a POS terminal/device associated with a trusted merchant.

Once the consumer instructions are received at block 805, operations may continue at block 810. At block 810, which may be optional in certain embodiments of the invention, the received consumer instructions may be communicated to a host associated with the payment device 105. For example, the host may receive the consumer instructions via the world wide web interface or from a kiosk or POS terminal/device. The host may determine whether or not the additions, deletions, and/or reordering will be allowed. For example, if the host is a financial institution that issued the payment device 105, the host may require an account associated with the host to be listed as the first account associated with the payment device 105. The host may, therefore, disallow any attempt by the consumer 125 to remove all payment accounts associated with the host or to reorder the payment accounts such that a payment account associated with the host is not a first payment account in a list of payment accounts. Additionally, the host may disallow the association of certain payment accounts with the payment device 105, for example, payment accounts associated with a direct competitor of the host.

Once the consumer instructions are communicated to the host at block 810, operations may continue at block 815. At block 815, which may also be optional in certain embodiments of the invention, approval information and/or other information associated with adding, deleting, and/or reordering payment accounts may be received from the host.

At block 820, information associated with adding, deleting, and/or reordering the payment accounts associated with the payment device 105 may be driven onto or otherwise communicated to the payment device 105. In addition to adding, deleting, and/or reordering payment accounts associated with the payment device 105, information associated with a payment account may be communicated to the payment device 105. For example, an updated account balance for a stored value account may be communicated to the payment device 105. Additionally, other information, for example, special promotions, targeted advertisements, incentive, coupons, vouchers, tickets, etc., may be driven onto or otherwise communicated to the payment device 105.

The method 800 may end following block 820.

FIG. 9 is a flowchart of one example method 900 for embossing a payment instrument with information associated with one or more payment accounts, according to an illustrative embodiment of the invention. The method 900 may be utilized to determine one or more payment accounts that are to be associated with a payment device, such as payment device 105. Information associated with the one or more payment accounts may be driven onto the payment device 105 during a personalization process of the payment device 105. Additionally, indications of at least a portion of the payment accounts may be displayed on the payment device.

The method 900 may begin at block 905. At block 905, an un-activated or un-initialized payment device may be received. A determination of one or more payment accounts to be associated with the payment device 105 may be made at block 905. Additionally, a determination of information associated with the one or more payment accounts that is to be displayed on the payment device 105 is made. A wide variety of information associated with the one or more payment accounts may be displayed on the payment device 105, for example, respective account numbers associated with the one or more payment accounts, respective expiration dates associated with the one or more payment accounts, and/or respective account titles or indicators associated with the one or more payment accounts. For purposes of describing FIG. 9, it is assumed that respective account numbers associated with the one or more payment accounts will be displayed on the payment device.

At block 915, the one or more account numbers to be displayed on the payment device 105 may be embossed or otherwise displayed on the payment device 105. In a situation in which the one or more account numbers are embossed onto the payment device 105, for example, the embossing of a plastic card, a three dimensional design associated with the one or more account numbers may be pressed or stamped onto the payment device 105. The information embossed or otherwise displayed on the payment device 105 may be associated with all of the payment accounts associated with the payment device 105 or with less than all of the payment accounts associated with the payment device 105.

At block 920, information associated with the one or more accounts associated with the payment device 105 may be driven onto the payment device 105 or otherwise communicated to the payment device 105. The information may be driven onto or otherwise communicated to the payment device 105 as part of a personalization process of the payment device 105 or as part of an over the air provisioning process associated with the payment device 105.

The operations described and shown in the methods of FIGS. 3-9 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-9 may be performed.

Accordingly, example embodiments of the invention can provide the technical effects of facilitating the selection of a payment account to utilize for a transaction based on an input personal identification number (PIN). In this regard, multiple payment accounts may be associated with a payment instrument and a consumer may select which payment account to utilize for the transaction.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for selecting a payment account for completing a payment transaction, the method comprising:
    collecting, by a point of sale (POS) terminal, data from a payment device associated with a mobile communication device utilized for the payment transaction;
    identify a number of a plurality of payment accounts is associated with the mobile communication device or payment device;
    receiving, by the POS terminal, a personal identification number associated with the mobile communication device or payment device;
    in response to receiving the personal identification number, identifying, by a processor of the POS terminal, a first portion and a second portion of the received personal identification number;
    communicating, by the processor of the POS terminal, the first portion and the second portion to a payment processor external to the POS terminal to conduct a security enhancement of the plurality payment accounts associated with the payment device by using the second portion comprising a two-digit alphanumeric number as a pointer to a matrix list of the plurality of payment accounts, the two-digit alphanumeric number identifies any one of the plurality of payment accounts when the number of plurality of payment accounts exceeds a predetermined number of payment accounts associated with the payment device;
    receiving, by the POS terminal, from the payment processor, a message that indicates the payment account is approved or denied for the payment transaction;
    in response to receiving the message that indicates the payment account number is approved, facilitating, by the POS terminal, the payment transaction, and
    facilitating, by the POS terminal, the payment transaction based at least in part upon communicating, to the payment processor, a second payment account number associated with the stored value account.

2. The method of claim 1, wherein collecting data from the payment device comprises collecting data via a payment device reader.

3. The method of claim 1, further comprising:
    parsing the personal identification number to identify one or more alphanumeric characters associated with the selected one of the plurality of payment accounts.

4. The method of claim 3, wherein parsing the personal identification number comprises parsing the personal identification number to determine a first alphanumeric character of the personal identification number, wherein the first alphanumeric character identifies the selected one of the plurality of payment accounts as a desired payment account.

5. The method of claim 1, wherein the collected data comprises data associated with each of the plurality of payment accounts, and further comprising:
    utilizing, by the POS terminal, the portion of the received personal identification number to identify a portion of the collected data associated with the payment account number for the selected one of the plurality of payment accounts.

6. The method of claim 1, wherein determining a payment account number for a selected one of the plurality of payment accounts comprises:
    requesting, by the POS terminal from the payment device based at least in part on the portion of the received personal identification number, the payment account number for the selected one of the plurality of payment accounts; and
    receiving, by the POS terminal in response to the request, the payment account number.

7. The method of claim 1, wherein the selected one of the plurality of payment accounts comprises a credit card account, a debit card account, a checking account, a savings account, or a stored value account.

8. The method of claim 1, further comprising:
    receiving, by the POS terminal, information associated with at least one of adding a payment account to the plurality of payment accounts or deleting a payment account from the plurality of payment accounts; and
    communicating, by the POS terminal, at least a portion of the information to the payment device.

9. A point of sale (POS) terminal for processing a payment transaction, the point of sale terminal comprising:
    at least one reader;
    at least one input device;
    at least one communications interface;
    at least one memory storing computer-executable instructions; and at least one processor, wherein the at least one processor is configured to access the at least one memory and to execute the computer-executable instructions to:

obtain, by the at least one reader, account information from a payment instrument associated with a number of a plurality of payment accounts;

receive, by the at least one input device, a personal identification number associated with the payment instrument;

in response to receiving the personal identification number, identifying, by a processor of the POS terminal, a first portion and a second portion of the received personal identification number;

communicating, by the processor of the POS terminal, the first portion and the second portion to a payment processor external to the POS terminal to conduct a security enhancement of the plurality payment accounts associated with the payment device by using the second portion comprising a two-digit alphanumeric number as a pointer to a matrix list of the plurality of payment accounts, the two-digit alphanumeric number identifies any one of the plurality of payment accounts when the number of plurality of payment accounts exceeds a predetermined number of payment accounts associated with the payment device;

receive, by the at least one communications interface, a message that indicates the payment account number is approved or denied for the payment transaction;

in response to receiving the message that indicates the payment account is approved, communicate, by the at least one communications interface, at least the payment account number to the payment processor to complete the payment transaction; and communicate, by the at least one communications interface to the payment processor to facilitate the payment transaction, a second payment account number associated with the stored value account.

10. The point of sale terminal of claim 9, wherein the at least one reader comprises a magnetic strip reader, an infrared reader, or a radio frequency identification (RFID) reader.

11. The point of sale terminal of claim 9, wherein the portion of the personal identification number comprises at least one alphanumeric character of the personal identification number.

12. The point of sale terminal of claim 9, wherein:
the at least one reader is further operable to request additional account information associated with the selected payment account based at least in part on the portion of the personal identification number and to receive the requested additional information, and
the communications interface is further operable to communicate at least a portion of the received additional account information to complete the payment transaction.

13. The point of sale terminal of claim 9, wherein:
the communications interface is further operable to receive information associated with adding an account to the plurality of accounts or deleting an account from the plurality of accounts, and
the at least one reader is operable to communicate the received information associated with adding or deleting an account to the payment instrument.

14. The point of sale terminal of claim 9, wherein the selected one of the plurality of payment accounts comprises a credit card account, a debit card account, a checking account, a savings account, or a stored value account.

15. The method of claim 5, wherein the portion of the received personal identification number comprises a first portion, and further comprising:
receiving, by the POS terminal, a verification of a second portion of the received personal identification number,
wherein facilitating the transaction comprises facilitating the transaction based at least in part upon the received verification.

16. The point of sale terminal of claim 9, wherein the account information comprises information associated with each of the plurality of payment accounts, and
wherein the at least one processor is further configured to identify, based at least in part upon the portion of the received personal identification number, a portion of the account information associated with the payment account number for the selected one of the plurality of payment accounts.

17. The point of sale terminal of claim 9, wherein the at least one reader is further configured to request, from the payment device, the payment account number for the selected one of the plurality of payment accounts and receive the payment account number, and
wherein the at least one processor is further configured to direct the at least one reader to request the payment account number based at least in part on the portion of the received personal identification number.

* * * * *